Nov. 28, 1939.  M. LEICHSENRING, JR  2,181,699

MOTOR VEHICLE

Filed Aug. 23, 1933

Inventor:
Max Leichsenring, Jr.
By Crandall Parker Carlson
Attys.

Patented Nov. 28, 1939

2,181,699

UNITED STATES PATENT OFFICE 2,181,699

MOTOR VEHICLE

Max Leichsenring, Jr., Chicago, Ill.

Application August 23, 1933, Serial No. 686,397

31 Claims. (Cl. 192—13)

The invention relates to motor vehicles and more particularly has reference to the brake and disengageable power transmission mechanisms thereof.

An object of the invention is to provide novel means operable either optionally or automatically for maintaining the brake mechanism of a vehicle in brake-applying condition whenever the power transmission mechanism is disengaged.

Another object is to provide a novel means in connection with a fluid actuated brake system for maintaining the brakes in braking condition, said means being controlled by manipulation of the disengageable power mechanism.

More specifically stated, an object resides in the provision, with a fluid actuated brake system and clutch mechanism controlled either manually or by vacuum, of valve means operable to retain fluid in brake actuating condition, the system after the brakes have been set by the operator, and means responsive to the movements of the clutch actuating means for manipulating the valve means to retain or release the fluid.

Another object is to provide novel means for limiting to a predetermined maximum the force which may be applied to the brakes while the brakes are held in applied condition by the disengageable power transmission mechanism.

A further object is to provide simple means for performing the purposes set forth in the preceding objects, which means is in the nature of an attachment for vehicle structures.

Other objects and advantages will become apparent in the following description and from the accompanying drawing, in which.

Figure 1:
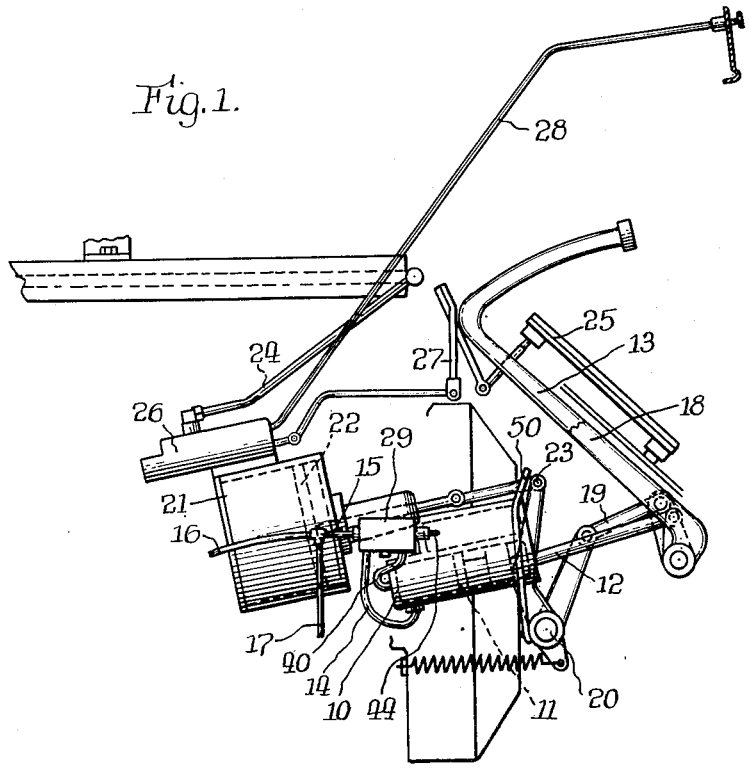
Figure 1 is a fragmentary and somewhat diagrammatic view of a motor vehicle embodying the features of the invention.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In Fig. 1 of the drawing, I have shown somewhat diagrammatically certain operating elements of the brake and disengageable power transmission mechanisms of a motor vehicle.

The illustrated brake mechanism is of the type which utilizes a fluid pressure system for actuating the brakes. The power transmission mechanism, which is shown, is of the type which includes a clutch adapted for actuation to a disengaged condition either by the usual foot pedal or by a vacuum operated mechanism. It is to be understood, however, that these mechanisms are shown merely for the purpose of illustration and that types other than those shown could be used.

First, describing the brake operating mechanism as herein illustrated, a master cylinder 10 has a reciprocating piston 11 therein which is connected through suitable linkage 12 with an actuating foot pedal 13. Movement of the piston 11 in the cylinder when the operator depresses the pedal 13 places fluid in the system under pressure and forces such pressure fluid from the cylinder through conduits 14 and 15. Communicating with the conduit 15 are branch conduits 16 and 17 which lead respectively to the front and rear brake actuating devices. Normally release of the pedal 13 allows a return flow of fluid to the cylinder to release the brakes, and this action is usually facilitated by suitable springs.

The disengageable power transmitting mechanism includes a conventional type of clutch device (not shown) which is movable to a disengaged position upon depression by the operator of foot lever 18 which is connected through linkage 19 with a clutch operating shaft 20. The clutch operating shaft 20 may also be automatically actuated to disengage the clutch mechanism. Thus, a cylinder 21 has a piston 22 therein which is operatively connected through linkage 23 with the shaft 20. The cylinder 21 is connected through a conduit 24 with the intake manifold of the engine so that a predetermined low pressure or vacuum in the manifold will move the piston 22 and, through the connecting linkage 23, rotate the shaft 20 in a clutch disengaging direction. Usually the parts are so arranged that, when the driver of the vehicle releases the accelerator 25, the mechanism operates to disengage the clutch. Located in the casing 26 is suitable means (not shown), so connected with the accelerator 25 through linkage 27 that the initial movement of the accelerator relieves the piston 22 of its actuating force and allows it to return to its normal position thereby effecting reengagement of the clutch mechanism. Other control means in the casing 26 is manipulable by the operator through linkage 28 for optionally rendering the vacuum control mechanism inoperative.

Figure 2:
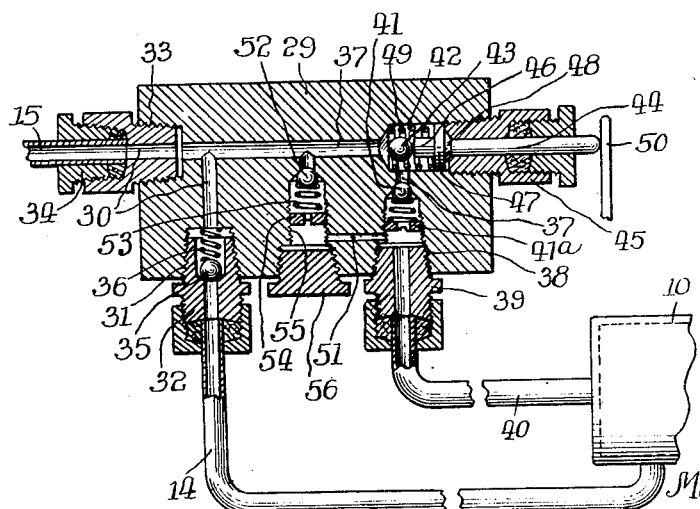
Fig. 2 is an enlarged view in central section of the mechanism for coordinating the brake and transmission mechanisms.

A preferred means by which the brake and power transmission mechanisms are coordinated so that the brakes may be held or maintained in any position to which they have been moved by the operator whenever the power transmission mechanism is disengaged, may best be seen in Fig. 2. Briefly this means comprises a check valve, which prevents a return flow of pressure fluid to the master cylinder after the operator has released the brake mechanism, and a by-pass around the check valve, which communicates with the master cylinder and is operatively controlled by means responsive to the movements of the disengageable power transmitting mechanism. In the present embodiment, 29 designates a valve casing having a passageway 30 therein. One port 31 of the passageway communicates, through a suitable nipple 32, with the conduit 14 which leads to the master cylinder 10. The port 33 at the other end of the passageway 30 is connected through a nipple 34 to the conduit 15 which, in turn, leads to the conduits 16 and 17. The nipple 32 is internally recessed to provide a seat for a ball valve 35 which is spring urged, as at 36, against said seat and is so disposed as to prevent a return flow through conduit 14 to the master cylinder 10. The casing 29 has a by-pass 37 therein which extends between the passageway 30 and a third port 38. Communicating with the port 38 through a nipple 39 is a conduit 40 which leads to the master cylinder 10. A spring pressed check valve 41 held in place by an annular nut 41a is provided adjacent to the nipple 39 and this check valve is, for a purpose to be hereinafter set forth, arranged to prevent a flow of fluid from the master cylinder 10 through the conduit 40 and into the system.

The by-pass 37 is controlled by a valve which in turn is responsive to movements of the clutch disengaging mechanism. Thus, interposed in the by-pass 37 and located between the check valve 41 and the passageway 30 is an enlarged chamber 42 within which a free ball valve 43 is located. The mouth of the portion of the by-pass 37 which leads from the chamber 42 to the passageway 30 is finished to provide a seat for the ball valve 43. Alined with the last mentioned portion of the by-pass 37 is an axially reciprocable plunger 44 slidably mounted in a packing gland bearing 45. Within the chamber 42 the plunger 44 has a tip 46 engageable with the ball valve 43 and an enlarged head 47 having a part 48 fashioned as a valve for cooperation with a seat in the adjacent face of the bearing 45. A spring 49 bears between the head 47 and an internal wall of the chamber 42 and exerts its force to hold the head 47 normally against the bearing 45. It will be seen that this construction provides a normally open valve in control of the by-pass 37, which valve may be closed by movement of the plunger 44 inwardly of the valve casing to seat the ball valve 43. This valve, therefore, when seated and positively held in place prevents a return flow of fluid to the master cylinder.

While the foregoing structure is compactly arranged in a single valve casing the parts may be separated if the particular arrangement of the mechanisms require it. The several relationships, however, remain the same.

The means for holding the valve 43 in closed position is, in this instance, actuated by the clutch shaft 20 and comprises an elongated arm 50 which is rigidly secured to the clutch shaft 20 for movement therewith. The arm 50 is so located that it will engage and move the plunger 44 inwardly of the casing 29 as the clutch shaft is rotated to effect disengagement of the clutch mechanism. Preferably, the arm 50 causes the valve 43 to be seated immediately after disengagement of the clutch mechanism and releases the valve immediately prior to the initial reengagement of the clutch mechanism. The arm 50 is preferably of resilient material to provide some latitude in the adjustment of the parts and to eliminate the possible effect of vibration.

The operation of the mechanism will be considered with the vacuum clutch controlling mechanism in operative condition. Presuming that the vehicle is in motion and that the driver wishes to apply the brakes, his first act is, of course, to release the accelerator 25 whereupon the low pressure in the intake manifold causes movement of the piston 22 and swings the shaft 20 in a counterclockwise direction to disengage the clutch mechanism. This movement of the shaft 20 swings the arm 50 into engagement with the plunger 44 thereby actuating the valve 43 to close the by-pass 37. The operator now applies the brakes in the usual manner, thus forcing fluid from the master cylinder 10 through conduit 14, past check valve 35, through by-pass 30, conduits 15, 16 and 17 to set the brakes. The operator may now release the brake pedal 13 but, because of the check valve 35 and the closed position of the valve 43, the fluid is trapped and retained in brake applying condition.

This condition of the brakes is maintained as long as the valve 43 is closed. In order to release the brakes, the operator need only touch the accelerator 25 which effects, through the linkage 27 and its associated mechanism, a release of the piston 22 to allow the clutch mechanism to move into reengaged condition. The initial movement of the clutch shaft 20 carries the arm 50 away from the plunger 44, the valve 43 opens and the trapped fluid returns to the master cylinder 10, thus releasing the brakes.

When operation of the vacuum control mechanism has been discontinued, the clutch mechanism is actuated in the usual manner through the clutch pedal 18. The arm 50 swings in response to movements of the shaft 20 as controlled by the pedal 18 to close and open the valve 43 as has been described.

It will be evident that, by locating the arm 50 on the shaft 20 to close the valve 43 immediately after the clutch mechanism is disengaged and to open the valve just prior to initial reengagement of the clutch mechanism, the operator may by a relatively slight movement either of the accelerator or of the clutch pedal open the valve and release the brakes without reengaging the clutch mechanism.

Under certain circumstances it may be advisable to provide means for limiting the maximum force with which the brakes are held in applied condition by the clutch mechanism. For example, if the brakes are applied with full force by the operator the clutch mechanism would hold the brakes in that condition until release. Normally such an application of the brakes is seldom used except momentarily. Unless a means for limiting the holding force is provided, the operation of the clutch mechanism might cause the brakes to lock the wheels with possible disastrous results. The feature of limiting the maximum holding force applicable by the clutch mechanism is attained in this embodiment by providing a release duct 51 around the valves 43 and 41. This duct is controlled by a check valve 52 which is normally held closed by a spring 53 bearing on the valve and against an annular nut 54. The nut has screw threaded engagement within a recess 55 in the casing 29 for adjustment to vary the tension of the spring 53. A removable plug 56 closes the recess 55. In operation the tension of the spring 53 is adjusted by the nut 54 so that the force exerted thereby will hold the valve seated against the ordinary pressures which will be encountered. However at its maximum the spring force is insufficient to maintain the fluid under a pressure which will fully apply the brakes. The relief valve, of course, functions only when the fluid is trapped in the system since both sides of the valve are subjected to the same fluid pressure while the operator is actuating the brake mechanism. As a result of this construction the valve 43 and the relief valve 52 will cooperate to prevent the application and maintenance of the brakes with a force greater than a predetermined maximum. Or, in other words, the brake mechansm is maintained in braking condition by the application of a limited force or pressure. Should it be desirable to employ the present invention as a means for preventing coasting movement after the vehicle has been brought to a standstill, the relief valve may be adjusted to maintain only that fluid pressure in the system necessary to accomplish this purpose. The adjustment would then be such that the brake holding force would be insufficient to stop previously acquired vehicle movement but ample to hold the vehicle after it had first been stopped.

While types of valves other than the normally open valve 43 could be used, it is preferred that the normally open type be employed, since with a normally open valve requiring a definite manipulation to place the device in operation, delicate adjustments are not necessary. Moreover, if the device should break or function improperly the brake system will operate as though the device were not present.

The check valve 41 which is interposed in the return conduit to the master cylinder is not absolutely necessary but performs an important purpose in preventing leakage. Thus, fluid actuated brake systems generally use a light grade of oil as the fluid and it will be seen that, without the check valve 41, actuation of the plunger 11 to set the brakes would force the fluid through both conduits 14 and 40. If the valve 43 is closed, the pressure of the fluid flowing through the conduit 40 would be exerted in the chamber 42 behind the valve 43 and leakage from the casing 29 along the plunger 44 might result. The check valve 41 positively prevents such leakage. As may be seen in Fig. 2, the check valve 41 also traps fluid in the system, but the holding tension on the valve is so adjusted by the nut 41ᵃ that only light pressure, less than that held by the check valve 52, is retained in the system by the valve 41.

It will be evident from the foregoing that a novel mechanism has been provided which coordinates the brake and clutch mechanisms of a motor vehicle in such a manner that after the brake has once been moved to any position by the operator, further control of the brakes is effected by manipulation of the disengageable power transmission mechanism. The present device is entirely flexible in its operation and is capable of meetng all contingencies which may arise. Moreover, the device is simple in construction, efficient in operation, is convenient to install, and may be manufactured and sold at a low cost.

I claim as my invention:

1. The combination, in a vehicle, of a fluid brake system, a clutch mechanism, a valve interposed in said system to control the flow of fluid in a brake releasing direction and including yieldable means normally permitting said valve to occupy an open position, means connected with said mechanism and operable therewith to close said valve after said mechanism has moved to a disengaged condition, said valve when closed being effective to entrap fluid in the system in brake applying condition.

2. In mechanism of the character described having a disengageable power transmission device and a fluid actuated braking system including means for applying pressure to the fluid and conduits leading from said means to the brakes, the combination therewith of check valve means interposed in said conduits for preventing a return flow to the pressure applying means, a by-pass around said valve, check valve means interposed in said by-pass for preventing a flow therethrough from said pressure applying means, a normally open valve for controling said by-pass located between said last mentioned check valve means and the conduits leading to the brakes, and means responsive to the disengaging movement of said transmision device for closing said normally open valve.

3. In mechanism of the character described having a fluid actuated braking system including means for applying pressure to the fluid and conduits leading from said means to the brakes, the combination therewith of check valve means interposed in said conduits for preventing a return flow to the pressure applying means, a by-pass around said valve, check valve means interposed in said by-pass for preventing a flow therethrough from said pressure applying means, a control valve for said by-pass located between said last mentioned check valve means and the conduits leading to the brakes, and means for manipulating said control valve.

4. An attachment for a vehicle having a fluid actuating brake system and a disengageable transmission mechanism comprising, in combination, check valve means for connection in said system to prevent a release of fluid pressure to relieve the brakes, means providing a by-pass around said check valve through which by-pass such release may be effected, a control valve for said by-pass, and resilient means for connection with said disengageable transmission mechanism to engage and close said control valve in the disengaging movement of said mechanism.

5. The combination with the brake and clutch mechanisms of a vehicle, of means connected for actuation by the clutch mechanism for holding the brakes applied after the operator has set the brakes, and means for limiting the maximum force with which the brakes may be held by said clutch mechanism.

6. In a motor vehicle having a fluid actuated braking system and disengageable power transmission mechanism, the combination of means for applying the brakes, control means for said first mentioned means connected with said mechanism for maintaining the brakes in applied condition while said mechanism is disengaged, and means for determining the maximum force under which said brakes may be maintained in applied condition.

7. In a vehicle, the combination with a fluid actuated brake system, of means for maintaining fluid in said system under brake applying pressure after such brakes have been applied and released by the operator, and control means for releasing such fluid including adjustable means for relieving the pressure when the pressure of the fluid maintained in the system exceeds a predetermined maximum.

8. The combination with the brake mechanism of a vehicle, of means for holding the brakes applied after the operator has once set the brakes, including a fluid circulating system, means for automatically trapping fluid in said system to prevent release of the brakes after the operator has discontinued his manipulation of the brakes, and means for limiting the holding effect of the trapped fluid.

9. In mechanism of the character described, the combination with a fluid actuated brake system, having means for applying fluid under pressure to actuate the brakes, of means for preventing a release of such pressure fluid to release the brakes, a by-pass around said last mentioned means, and a relief valve in said by-pass for limiting the pressure of the confined pressure fluid.

10. A device for controlling the action of a fluid pressure actuated braking system comprising, in combination, a casing having therein a passageway for connection respectively to the outlet from the pressure fluid producing means of the system and to the pressure fluid duct leading to the brake mechanism, a one-way valve in said passageway disposed to prevent a return flow to the pressure fluid producing means, a by-pass in said casing around said one-way valve for such return flow, a valve in said by-pass manipulable to prevent such return flow, means for manipulating said last mentioned valve, and a relief passageway in said casing around said last mentioned valve and having a relief valve therein.

11. The combination with the brake mechanism and disengageable transmission mechanism of a vehicle, of means associated with said two mechanisms operative to maintain the brake mechanism in braking condition whenever the transmission mechanism is disengaged and including fluid pressure means for exerting a predetermined maximum pressure to maintain the brake mechanism in braking condition.

12. In a motor vehicle having a fluid actuated braking system and disengageable power transmission mechanism, the combination of means for applying the brakes, and control means for said first mentioned means connected with said mechanism for maintaining the brakes in applied condition under a predetermined maximum pressure while said mechanism is disengaged and for releasing said brakes when said mechanism is engaged.

13. In a vehicle, the combination with a fluid actuated brake system, of a valve interposed in said system which must be held in closed position, means for closing said valve to retain fluid in brake applying condition after the system has been operated, and means for normally retaining said last mentioned means in a position to permit said valve to remain open.

14. In a vehicle, the combination with a fluid actuated brake system, of a valve interposed in said system, and means manipulable by the operator for yieldably closing said valve to retain fluid in brake applying condition.

15. In a vehicle, the combination with a fluid actuated brake system, of an independent valve mechanism interposed in said system and operable to retain fluid therein in brake applying condition, and having means exerting a force on said valve mechanism for yieldably placing said valve mechanism in a normal valve open position, and means manipulable by the operator for closing said valve mechanism against the force of the yieldable means.

16. The combination with a vehicle brake mechanism having a fluid circulating system, of a device for holding the brakes applied after the operator has manipulated the brake mechanism to set the brakes and then discontinued his manipulation of the mechanism, said device including means for trapping fluid in said system, and means for limiting the holding effect of the trapped fluid.

17. The combination in a vehicle, of a fluid brake system, a clutch and power transmission mechanism, a valve device including a valve and resilient means acting to permit said valve to occupy an open position, said valve being interposed in said system to control the flow of brake actuating fluid, and means connected with said mechanism for closing said valve as said mechanism is disengaged whereby in the application of the brakes fluid is trapped to maintain the brakes in applied condition, said valve being released to open and release the brakes as said mechanism is reengaged.

18. In mechanism of the character described having a disengageable power transmission device and a fluid actuated braking system including means for applying pressure to the fluid and conduits leading from said means to the brakes, the combination therewith of check valve means interposed in said conduits for preventing a return flow to the pressure applying means, a by-pass around said check valve means, a control valve for said by-pass including actuating means normally urged to a valve open position, and means actuated by said transmission device for manipulating said actuating means to close the valve when said transmission device is disengaged and to release the valve for opening movement as the transmission device moves into engagement.

19. In a vehicle, the combination with a fluid actuated brake system and a clutch mechanism, of a valve device interposed in said system to control the flow of said fluid, yieldable means operable to condition said valve device to permit of a substantially unimpeded flow through said system, and means responsive to the disengaging and engaging movements of the clutch mechanism for respectively conditioning said valve device to impede flow and for permitting said valve device to assume the flow unimpeding condition thereof whereby alternately to trap fluid in the system and maintain the brakes in applied condition after the brakes have been applied by the operator and to release such fluid to release the brakes.

20. In a vehicle, the combination with a fluid actuated brake system and a clutch mechanism, of a valve having manipulative means associated therewith for closing said valve, means exerting a yielding force on said manipulative means for holding said manipulative means against valve closing movement, said valve being interposed in said system to retain fluid therein in brake applying condition, and means responsive to the disengaging movement of said clutch mechanism for actuating said manipulative means against the yielding force exerted thereon to close said valve.

21. In a motor vehicle having a fluid actuated braking system and a vacuum controlled clutch mechanism, the combination of means for maintaining the braking system in brake applying condition, means responsive to movements of the clutch mechanism for conditioning said first mentioned means for actuation, and means for limiting the maximum braking force under which the braking system is maintained in brake applying condition.

22. The combination with the brake system of a motor vehicle, of means for holding said system in brake applied condition, said means exerting a holding force which is insufficient to check previously acquired movement of the vehicle but is ample to hold the vehicle against retrograde coasting movement from a standstill condition.

23. The combination in a vehicle having a braking system and manually controlled mechanism for driving the vehicle, of means associated with the braking system for holding said system in operative brake applying condition with a force which is limited to less than that required to quickly stop the vehicle when moving, and means for releasing the brake holding means upon manipulation of said mechanism by the operator to initiate driven movement of the vehicle.

24. The combination, with the brake mechanism of a motor vehicle, of means for holding the mechanism in brake applying condition after the operator has in sequence manipulated and discontinued manipulation of said mechanism, said means operating with a holding force which is limited to a predetermined maximum and is less than the force required to bring the moving vehicle to a stop on a grade.

25. The combination in a vehicle having a brake mechanism, of means for holding said mechanism applied after the operator has once manipulated said mechanism to set it and then discontinued his manipulation thereof, said means for holding the brake mechanism applied including means for automatically limiting the maximum force with which said mechanism may be held in applied condition after the operator has discontinued his manipulation thereof.

26. The combination with the brake mechanism of a vehicle, of means for holding the brakes applied after the operator has once manipulated the brake mechanism to set the brakes and then discontinued his manipulation of the mechanism, including means for automatically limiting the maximum force with which the brakes may be held in applied condition.

27. The combination with the brake mechanism of a vehicle, of means for holding the brakes applied after the operator has once manipulated the brake mechanism to set the brakes and then discontinued his manipulation of the mechanism, said means exerting a holding force which is insufficient to check previously acquired movement of the vehicle but is ample to hold the vehicle against movement from a standstill condition.

28. In a motor vehicle having a fluid actuated braking system, the combination, with a flow system between the brakes and the master cylinder, of a check valve in said system including a ball valve, a valve seat and means controlled independently of the brake system for conditioning said ball valve and valve seat for cooperative association to maintain brake applying fluid in the system, said means being releasable to permit of relative separating movement of said ball valve and valve seat.

29. In a motor vehicle having clutch mechanism and a fluid actuated brake system, the combination of a valve device in said system for maintaining brake applying pressure fluid therein, said device including a relatively movable ball valve and valve seat, and means connected for movement by the clutch mechanism to condition said ball valve and seat for operative fluid holding association when the clutch mechanism is disengaged, and for retraction when the clutch is engaged to effect relative separation of said ball valve and valve seat.

30. In a motor vehicle having clutch mechanism and a fluid actuated brake system, the combination of a valve device in said system for maintaining brake applying pressure fluid therein, said device including a relatively movable ball valve and valve seat, means movable into and out of operative position for conditioning said ball valve and seat for operative fluid holding association, and means actuated as the clutch moves into and out of engaged position for moving said first named means correspondingly into and out of its operative position.

31. In a vehicle, the combination of a pressure fluid actuated brake system having a line operatively communicating with the pressure fluid responsive means for actuating the brakes, manipulable means operable by the user for delivering fluid under pressure through said line to said responsive means and for releasing such pressure fluid therefrom when the actuation of said manipulable means is discontinued, and means independent of said manipulable means for retaining fluid under a predetermined maximum pressure for actuating said responsive means.

MAX LEICHSENRING, Jr.